United States Patent [19]

Holm

[11] 3,949,363
[45] Apr. 6, 1976

[54] BAR-CODE/MICR/OCR MERGE
[75] Inventor: Larry L. Holm, Dallas, Tex.
[73] Assignee: Recognition Equipment, Incorporated, Irving, Tex.
[22] Filed: June 28, 1974
[21] Appl. No.: 484,073

[52] U.S. Cl. ............... 340/146.3 D; 235/61.11 E; 340/146.3 C
[51] Int. Cl.² .......................................... G06K 9/18
[58] Field of Search .......... 340/146.3 D, 146.3 AH, 340/146.3 B, 146.3 Z, 146.3 C; 235/61.11 E, 61.12 R, 61.12 N, 61.12 M

[56] References Cited
UNITED STATES PATENTS

| | | | |
|---|---|---|---|
| 3,578,953 | 5/1971 | Milford et al. ................ | 340/146.3 Z |
| 3,703,628 | 11/1972 | Philipson, Jr. ................ | 340/146.3 Z |
| 3,764,978 | 10/1973 | Tyburski et al. ............ | 340/146.3 ED |
| 3,764,980 | 10/1973 | Dansac et al. ................ | 340/146.3 D |
| 3,876,981 | 4/1975 | Welch ........................ | 340/146.3 ED |
| 3,895,350 | 7/1975 | De Vries ...................... | 340/146.3 D |

*Primary Examiner*—Leo H. Boudreau
*Attorney, Agent, or Firm*—Richards, Harris & Medlock

[57] ABSTRACT

A redundant character recognition system which minimizes both read failures and ambiguities caused by conflicting read signals by merging character recognition signals from MICR, OCR and Bar-Code read heads to produce a single data stream for automatic sorting of a constant velocity train of documents. In the event the MICR and OCR readers are unable to identify a character image, a Bar-Code reader is used to supplement MICR/OCR data by replacing MICR data field rejects with bar-code data field recognition signals. When rejects are generated from both the MICR and bar-code data fields, only self-checking fields within the bar-code data field are merged upon a successful self-check test being performed. If self-checking errors occur, the MICR read data is restored.

29 Claims, 6 Drawing Figures

BAR-CODE/MICR/OCR MERGE

FIELD OF THE INVENTION

The present invention relates to reading systems, and more particularly to redundant character recognition systems employed in the high speed sorting of a train of documents having MICR and corresponding Bar-Code data imprinted thereon.

BACKGROUND OF THE INVENTION

Financial documents evidencing transactions involving banking institutions typically are subjected to two complementary processes. The first involves the capturing of data from the document, and imprinting thereon encoded data in a Magnetic Ink Character Recognition (MICR) format, for example, E13B or 1403 fonts in human readable form.

A further simplification allowing higher speed processing of financial documents is the addition of magnetic ink bar-codes in machine readable form as disclosed in U.S. Pat. No. 3,703,628 and copending application Ser. No. 448,458, filed Mar. 6, 1974, now abandoned.

After the data has been captured, encoded, and reprinted upon the face or back of a document with magnetic ink, subsequent transactions may require repeated sorting and classification of large quantities of the encoded documents. High speed sorting processes in the prior art include the reading of encoded data by a MICR reader, an Optical Character Recognition reader (OCR), or a redundant reading system which merges the recognition signals of MICR and OCR readers.

U.S. Pat. No. 3,764,978 discloses a system for character recognition in which a plurality of MICR characters are recognized both magnetically and optically. When the magnetic reader fails to recognize a character and the optical reader is successful in recognizing it, the optical character signal is generated for further processing. If the optical reader fails to recognize a character and the magnetic reader is successful, then the identification signal generated corresponds to the character recognized by the magnetic reader. However, when the magnetic and optical readers generate different character recognition signals for the same character image, an ambiguity results which is either resolved by generating a reject signal, or a choice is made between the optical and magnetic recognition signals based upon criteria dictated by the particular application and print font used.

A merged MICR/OCR system significantly decreases the number of rejects occurring during the sorting of a high velocity train of documents. However, the remaining number of rejects generated from valid data fields, and the ambiguous results caused by conflicting recognition signals are still prohibitive to those banking institutions handling large volume transactions daily. Although criteria characterizing a particular application may be formulated, the multifarious aspects of the daily financial transactions make the choice between conflicting magnetic and optical recognition signals too complex to be treated generally. Further, damage to a MICR data field occurring between a data capture operation and subsequent reprocessing may cause a document to be rejected.

SUMMARY OF THE INVENTION

The present invention is directed to a redundant character recognition system for automatic sorting of documents encoded with both MICR alphanumeric characters and machine readable bar-codes.

More particularly, encoded financial documents are transported at a constant velocity through a read module including a bar-code, a MICR and an OCR read head. OCR and MICR recognition signals are merged to produce a single data stream which, if no rejects or ambiguities occur, is further processed to control a normal sorting operation. In the event a reject or conflicting magnetic and optical recognition signals occur, the bar-code data field is used to supplement the MICR data field. If no rejects are generated by the Bar-Code reader, the bar-code recognition signal replaces signals generated from the MICR data field. However, if rejects occur from both the MICR and bar-code data fields, only self-checking fields having test digits are merged. In the event a self-check error occurs, the bar-code data is ignored and the original MICR read data is reinstated.

DESCRIPTION OF THE DRAWINGS

For a more complete understanding of the present invention and for further objects and advantages thereof, reference may now be had to the following description taken in conjunction with the accompanying drawings in which.

DESCRIPTION OF PREFERRED EMBODIMENTS

FIG. 1

Figure 1:
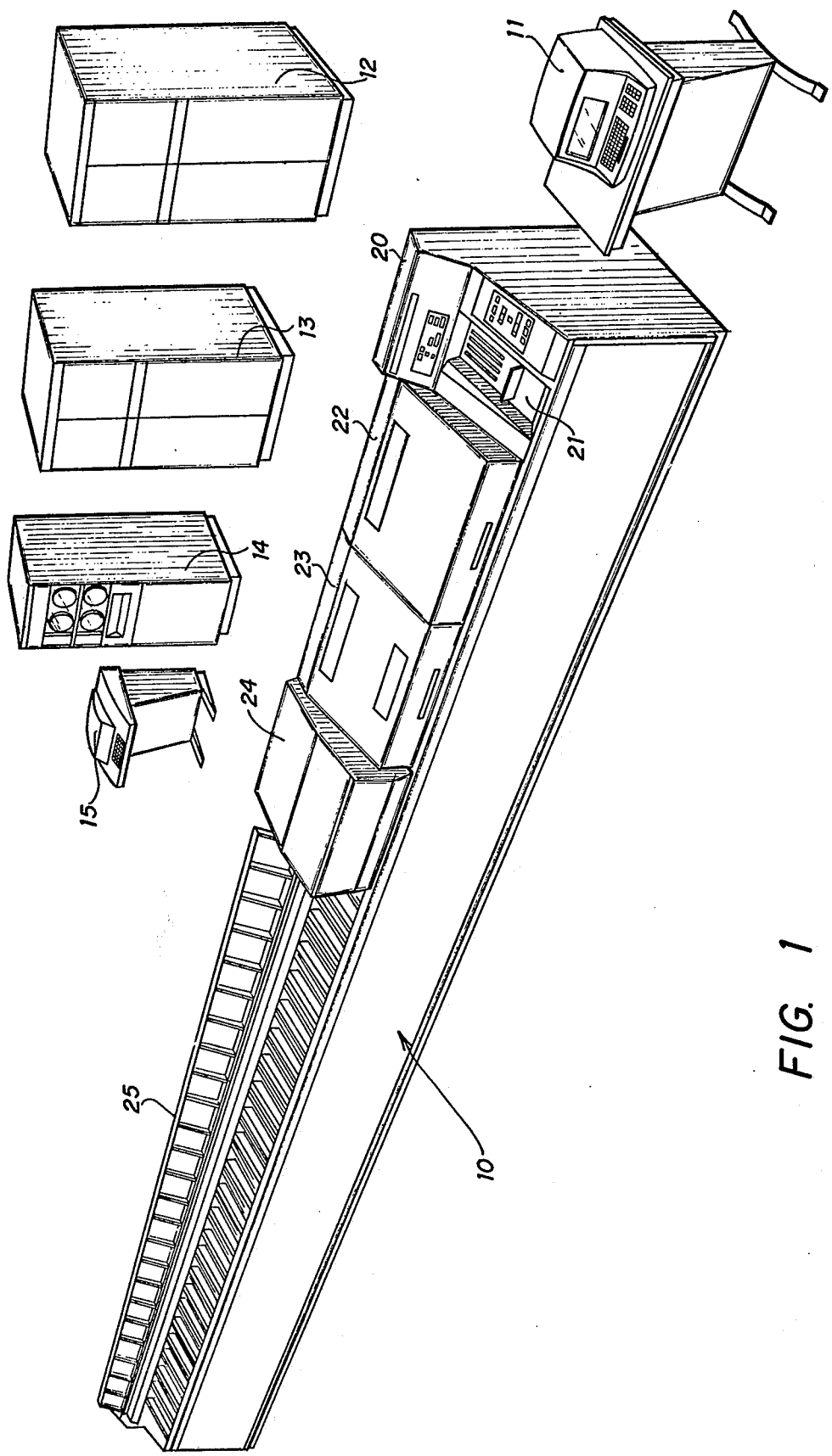
FIG. 1 is a perspective view of a complete system embodying the present invention.

Referring now to FIG. 1, an automatic system for processing documents is illustrated wherein a main transport unit 10 has associated therewith an operator CRT/keyboard unit 11, a recognition unit 12, a control unit 13, a computer sub/system unit 14 and a teletype 15.

Transport 10 comprises a document feeder 20 having a tray 21 into which a stack of financial documents such as checks is placed. The checks are then moved serially as an uninterrupted train through a read module 22, a bar-code/IJP module 23, a module for a microfilm camera 24 and thence to a family 25 of sorting bins. The checks are sorted based on codes born by each check to provide for distribution and to facilitate accounting procedures.

The present invention is concerned with the operations carried out in connection with module 22 while the system is in a sort only mode.

Figure 2:
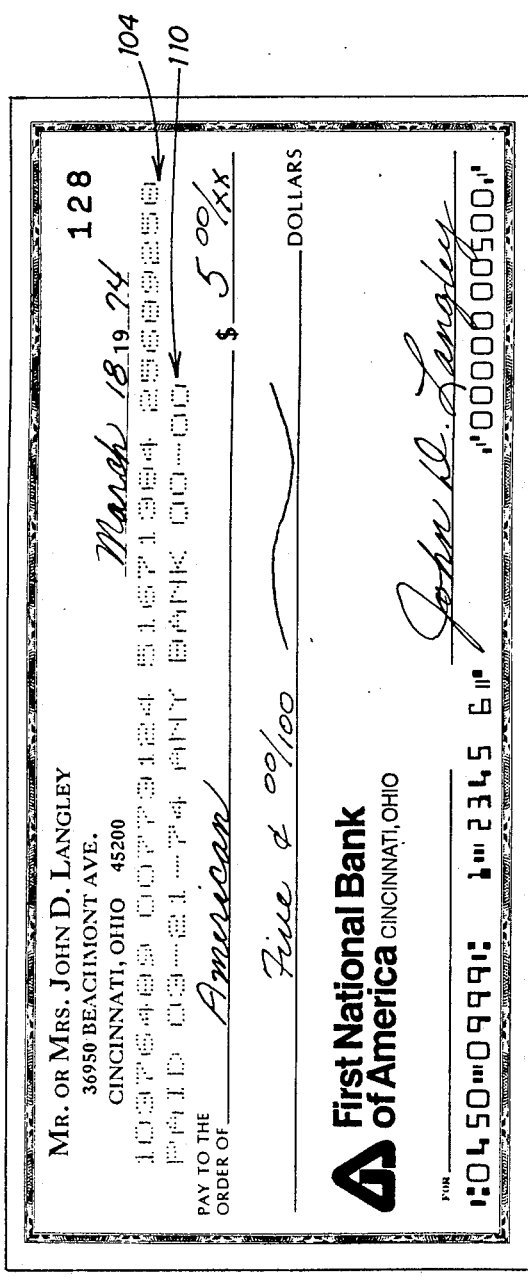
FIG. 2 illustrates the face of a fully processed and cancelled personal check.
Figure 3:
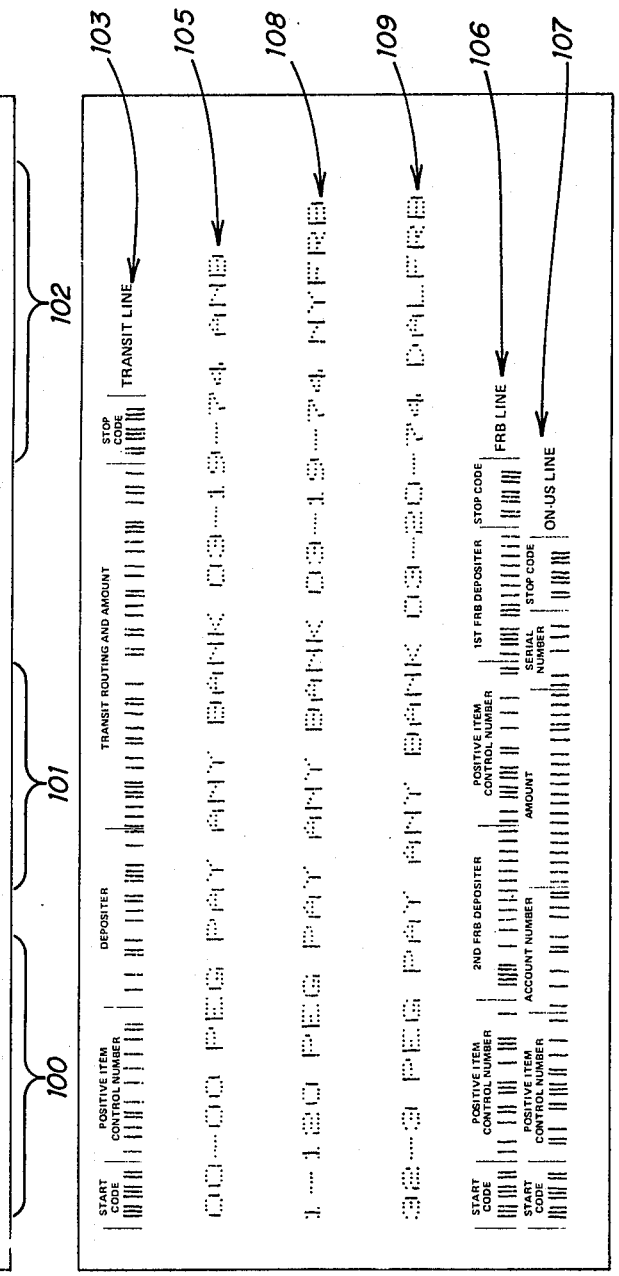
FIG. 3 illustrates the back of the check illustrated in FIG. 2.

FIGS. 2 and 3

The face of a fully encoded personal check is illustrated in FIG. 2 and the back of the check is illustrated in FIG. 3. The bottom line on the check, FIG. 2, comprises three data fields. The first field 100 is coded to represent the identity of the bank on which the check is drawn. The second field 101 is coded to represent the identity of the maker. The check amount in the last field 102 is manually encoded when the check is received by a first banking institution in its flow for collection. Other fields may also be included on the same line and may be read and utilized for special purposes not necessary to the present invention.

The fields 100–102 are encoded in magnetic ink characters of a special font which has been generally adopted by the financial community for encoding and making possible the Magnetic Ink Character Recognition (MICR) operations in handling financial documents such as checks.

In a normal financial transaction, an ink jet printer is employed at a first bank to which the check is represented to record necessary transit information on a top line 103 on the back of the document. Line 103 comprises bar encoded fields including a start code, a control number, depositor identification, a transit routing code, an amount code, and a stop code. At the same time, an alphanumeric printer applies the control number on line 104, FIG. 2, on the face of the check. The alphanumeric printer also is employed to endorse the back of the check on line 105 to indicate that "any bank" is to be paid. The document is then sorted based upon the transit routing code on line 103.

Checks on the first bank which have been sorted and routed to a first Federal Reserve Bank (FRB) are again tested by a suitable system upon receipt. The first FRB applies its code and a control number on line 106 in the first FRB depositor field, and endorses the check on line 108 to a second FRB. The second FRB endorses the check on line 109 to a bank on which the check is drawn, and routes the check to that bank.

When checks are received from an FRB, a bank tests the MICR encoded transit routing in field 100, FIG. 2, to determine if the item is drawn on them. A unique control number is encoded on line 107 as is an account number, an amount (if not on top line), a transaction code, and a serial number. The bank then cancels the check by printing the notation indicated on line 110, FIG. 2, on the face of the document.

In connection with each of the foregoing transactions, the encoded data is read into an accounting system in order that the necessary bookeeping operations for each institution through which the document passes can be carried out under automated control and in accordance with established and well known principles.

FIG. 4

Figure 4:
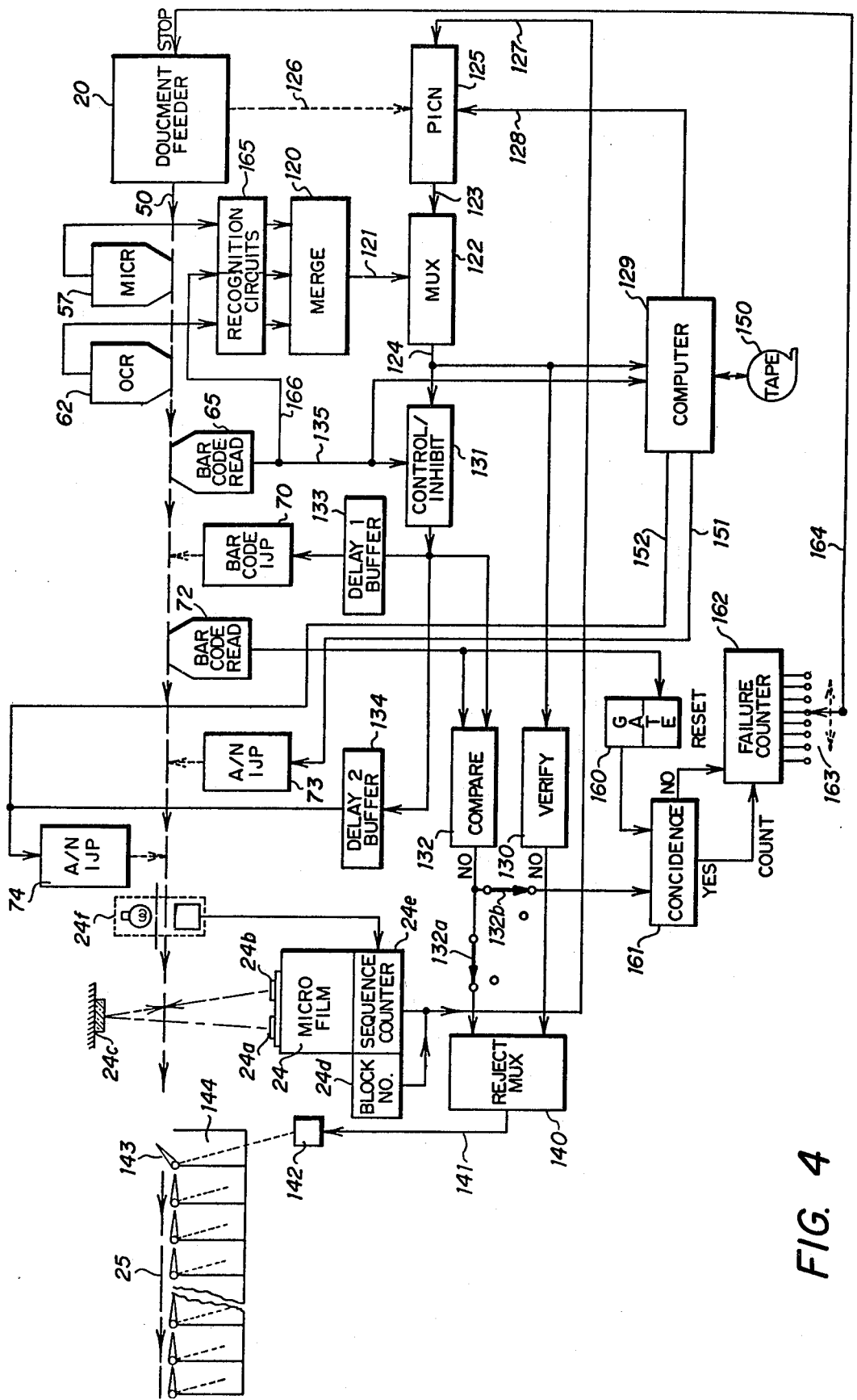
FIG. 4 is a more detailed block diagram of the system illustrated in FIG. 1.

Referring now to FIG. 4, a system embodying the present invention is illustrated which may be generally of the type described and claimed in patent application Ser. No. 448,458, filed Mar. 6, 1974, for Trace Automated Processing of Financial Documents, now abandoned. The illustrated system, configured for both data capturing and document sorting operations, is manufactured and sold by Recognition Equipment Incorporated of Dallas, Tex., and identified to the public as CS2424.

Document feeder 20 starts documents along their path beginning at point 50 so that a MICR reader 57, an OCR reader 62 and an alphanumeric ink jet gun 74 are associated with the face of the documents. A bar-code reader 65, a bar-code ink jet gun 70, a bar-code reader-verifier 72, and an alphanumeric ink jet gun 73 are associated with the back of the documents. A microfilm camera 24 is adapted to record both the document face by a lens system 24a and a mirror 24c, and the document back by lens system 24b.

In sort mode, output signals from MICR reader 57, OCR reader head 62 and bar-code reader 65 are applied through recognition circuits 165 to a merge unit 120. The three inputs to merge unit 120 are employed to produce a single output data stream on a channel 121. Character read failures occurring in the output of reader 57 may be supplemented by merging corresponding output from the OCR reader. The incidence of read failures occurring in the resulting data stream is greatly reduced relative to systems which use either reader 57 or an OCR reader 62 alone. However, remaining read failures together with the occurrence of conflicting identification data from reader 57 and reader 62 presents a very significant problem. The present invention provides a bar-code reader 65 to minimize read failures and ambiguities of a combined magnetic and OCR reader system.

During a data capturing operation, OCR and MICR data signals are processed as before described. However, bar-code read data along line 166 is ignored.

A channel 121 is connected to a multiplexer 122 in which the information on channels 121 and 123 are combined to provide an output on channel 124 which includes the data on fields 100–102, FIG. 2, combined with a Positive Item Control Number (PICN) on channel 123, facilitating the reentry of rejected documents into the document stream. Channel 123 leads from a PICN generator 125, which may be linked to the flow of documents from the feeder 20 as by way of a linkage 126. Preferably, however, the generation of a PICN is correlated with a block number and the last four digits of a block sequence from counters 24d and 24e in a microfilm camera 24, as applied by a channel 127 from camera 24 to PICN generator 125. A sensor 24f is shown in relation to a sequence counter 24e to provide for generation of the PICN, and to aid in the operation of camera 24 and in the use of the photographic record produced by camera 24. A channel 128 extends from a central computer 129 for synchronization purposes. Thus, the combination of the data from fields 100–102 appears on the output channel 124 along with the PICN for the document from which such data is obtained.

Data on channel 124 is applied to a computer 129, to a verify unit 130 and to a control/inhibit unit 131. Unit 131 applies the same output to a comparison unit 132 and to delay buffers 133 and 134.

The output of the bar-code reader 65 is applied to circuits 165, and by way of channel 135 to a control/inhibit unit 131 and computer 129. If the bar-code reader 65 senses a bar-code previously printed on line 103, FIG. 3, for example, it will inhibit bar-code printers 70 and 74. If a document has not been previously encoded, then the data from the control/inhibit unit 131 will be applied by way of delay buffers 133 and 134 to the ink jet guns 70 and 74. Bar-code reader 72 supplies a second input to the comparison unit 132. If the data from channel 124 is the same as that printed by the gun 70 and thereafter read from the document by reader 72, then the document may pass through to sorter 25. However, if on comparison the encoded data on the document does not correspond with the input to the gun 70, then the output of compare unit 132 is applied to a reject multiplexer 140 by way of a selector switch 132a. The output of multiplexer 140 appears on channel 141 and is applied to control unit 142 to actuate a gate 143. Gate 143 diverts the improperly or incompletely coded document into a reject bin 144.

The output of bar-code reader 72 is connected to a gate 160 whose output is connected to one input of a coincidence circuit 161. The output of compare unit 132 is connected by way of a switch 132b to the second input of coincidence circuit 161. The true output of circuit 161 is connected to a failure counter 162. The false output of the coincidence circuit 161 is connected to the reset terminal of counter 162. The output of connector 162 may be selected by means of switch 163 to apply a stop control signal by way of line 164 to the document feeder. Gate 160 may be a monostable multivibrator that is gated on once upon appearance of each document at reader 72, and stays on for a period corresponding to the passage of the document past reader 72. It will be recalled that comparison unit 132 provides a true output when there is failure in the comparison between that which was applied to the printer 70 and that which is read by reader 72. The output of unit 132 may then be applied by way of switch 132to the second input of coincidence unit 161.

Each time there is failure in the comparison unit 132, a pulse will be applied to counter 162. Otherwise, a reset pulse will appear at the reset terminal of counter 162. By means of switch 132b, gate 160, coincidence circuit 161, counter 162 and selector switch 163, the system can be shut down if a selected number of consecutive documents are not properly encoded by printer 72. In practice, the systems have been operated to shut down when five consecutive documents are not properly imprinted by printer 70.

The switch 132a also permits selection of the function of sorting to a reject bin 144 every document which fails to meet the test comparison unit 132. Either or both of the functions provided by switches 132a and 132b may be employed. In some operations, it has been found to be more economical to sort and reenter documents not properly imprinted by the printer 72 at a state later than the first pass in the system. When both switches 132a and 132b are conductive, rejects are sorted into bin 144 and the system will be shut down if more than the number allowed by the selected output appear in succession.

Data on channel 124 is applied to verify unit 130. This provides a check to make certain that all of the characters appearing in field 100–102, FIG. 2, are successfully identified. If any character is not identified in a block where data is known to exist, then the reject multiplexer 140 is actuated to divert the document to the bin 144. It will be noted that in such cases, codes for all characters properly identified on channel 124 are applied through buffers 133 and 134 to guns 70 and 74 partially to encode the document on its first pass through the system. Such partially coded documents may then be examined and correlated with a record applied to a tape unit 150 by computer 129 so that a complete encoding of the document may be ultimately completed on line 103, FIG. 3, and a record thereof provided on tape 150.

As before described, read data from bar-code reader 65 is applied along line 166 to circuits 165 during the sort only mode. In addition, units 131 and 132, guns 70, 73 and 74, delay buffers 133 and 134, bar-code reader 72, sensor 24f, microfilm camera 24 and generator 125 are deactivated. Thus, the data fields of a constant velocity train of documents are read by MICR reader 57, OCR reader 62, and bar-code reader 65, and the signals so generated are merged in a manner to be described. The single resulting data stream is applied to verify unit 130 as during a data capturing operation. If all the characters appearing in a data field are successfully identified, the document is passed through to sorter 25.

Continuing with the description of the system of FIG. 4, a channel 151 extends from computer 129 to provide for actuation of gun 73 when and if it is desired to endorse a train of checks as by imprinting on one of lines 105, 108 or 109, FIG. 3. A channel 152 extends to gun 74 to provide for cancellation by printing as on line 110, FIG. 3.

Discrete elements have been shown in the system of FIG. 4. For example, multiplexer 122, control/inhibit unit 131, delay buffers 133 and 134, comparison units 132, verify unit 130, gate 160, coincidence unit 161 and counter 162 are shown. It will be appreciated that these units, as well as others, may be implemented through the use of software in connection with operation of computer 129. However, they have been separately shown in FIG. 4 in order that their functions may more readily be understood.

FIG. 5

Figure 5:
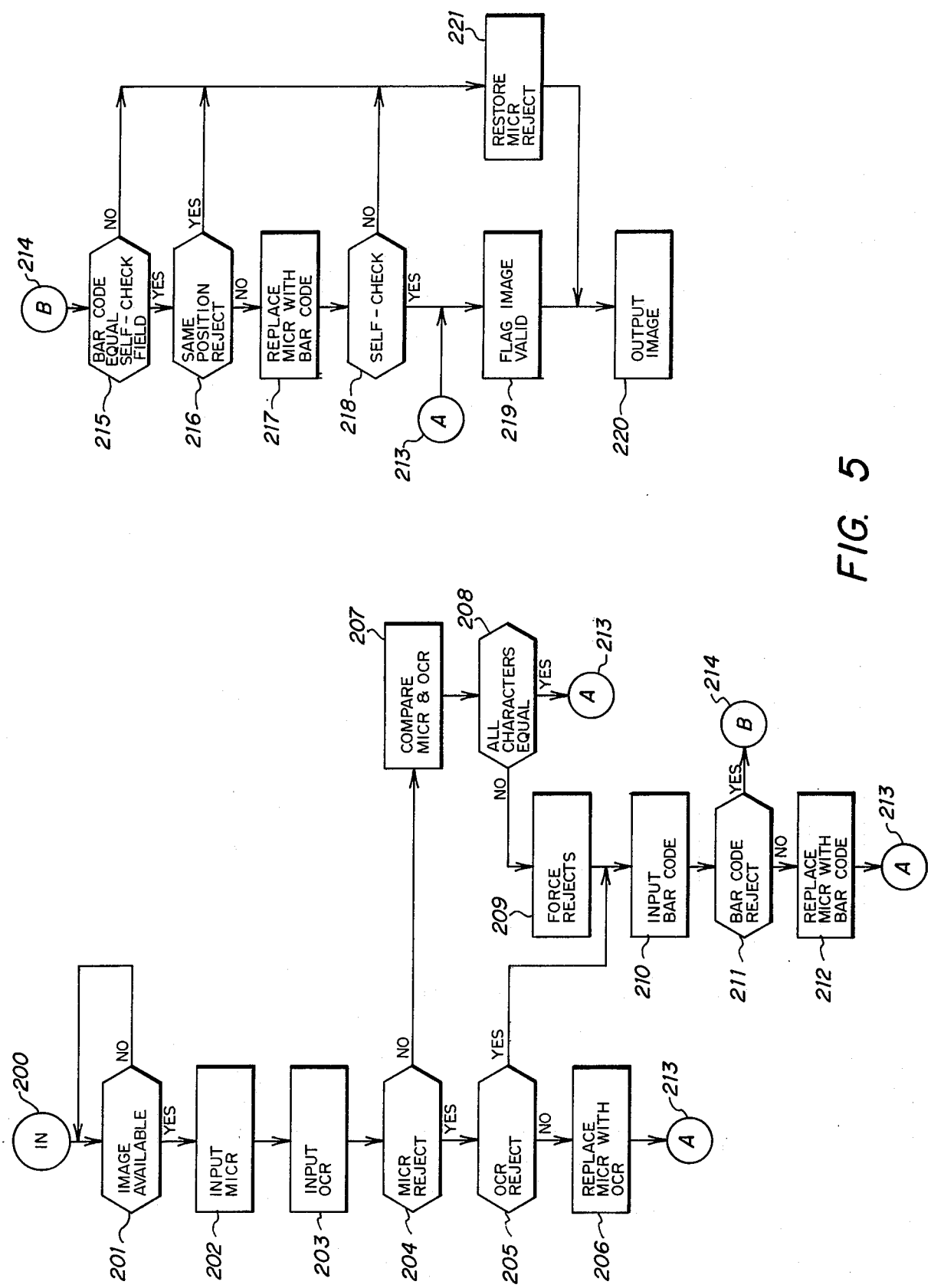
FIG. 5 is a decision flow diagram of the merge unit illustrated in FIG. 4.

The decision flow of the merge process performed within merge unit 120, FIG. 4, is illustrated in FIG. 5. Upon entering unit 120 at state 200, the decision flow cycles between state 201 and state 200 until a hardware signal is received indicating that a data field image is available. Upon receiving the hardware signal, the decision flow proceeds through state 202 and 203 where the MICR and OCR read data is accepted from recognition circuits 165, FIG. 4.

The MICR data is examined at state 204 for rejects which indicate a read failure. If rejects are present, the decision flow continues to state 205 where the OCR read data is examined for rejects. If no rejects are present, then a transfer is made to state 206 where the MICR read data is replaced with the OCR data. The decision flow then continues to state 213, where a transfer is made through node A to state 219 to set a valid image flag. The merged MICR/OCR image data is then output at state 220 from merge unit 120 to multiplexer 122, FIG. 4.

In the event no rejects are present in the MICR read data at state 204, the decision flow continues to state 207 where a comparison is made between the MICR and the OCR read data. If the OCR and MICR character recognition signals are identical for each character in a data field, then a transfer is made from state 208 to state 213 where the process continues as before. However, if the character recognition signals for a given character image are not identical, then the decision flow proceeds from state 208 to state 209 where a reject flag is set. A transfer is then made to state 210 to examine the bar-code read data.

A transfer to state 210 also is made from state 205 when rejects are present in both the MICR and the OCR read data. If the bar-code read data contains rejects indicating read failures, then a transfer is made from state 211 to state 214, where the decision flow proceeds through node B to state 215. However, if no rejects are present in the bar-code read data, the MICR read data is replaced with the bar-code data at state 212 and a transfer is made to state 213 as before described.

In the event a read failure is indicated in the bar-code read data at state 211, the bar-code data field is examined at state 215 for check digits indicating a self-checking field. If the bar-code data field is not a self-checking field, the decision flow continues to state 221 where the MICR read data is restored and output at state 220.

If a self-checking field is present in the bar-code data field, then a transfer is made from state 215 to state 216 where a test is made to determine whether the MICR-/OCR reject occurred at the same position as the bar-code reject. If so, the MICR read data is restored at state 221 and output at state 220 as before. If not, the MICR/OCR read data is replaced with the bar-code read data at state 217, and the bar-code data field is tested at state 218 for self-checking errors. The occurrence of self-checking errors causes a transfer to be made to state 221 where the MICR read data is restored and output at state 220. If no self-checking errors occur, then a flag is set to indicate that a valid image has been generated. The bar-code image data is then output at state 220.

Upon receiving a valid image indication from merge unit 120, multiplexer 122 applies the image data to verify unit 130, FIG. 4. If all of the characters appearing in a data field have been successfully identified, then a document or check being read is passed on to sorter 25 as before described.

FIG. 6

Figure 6:
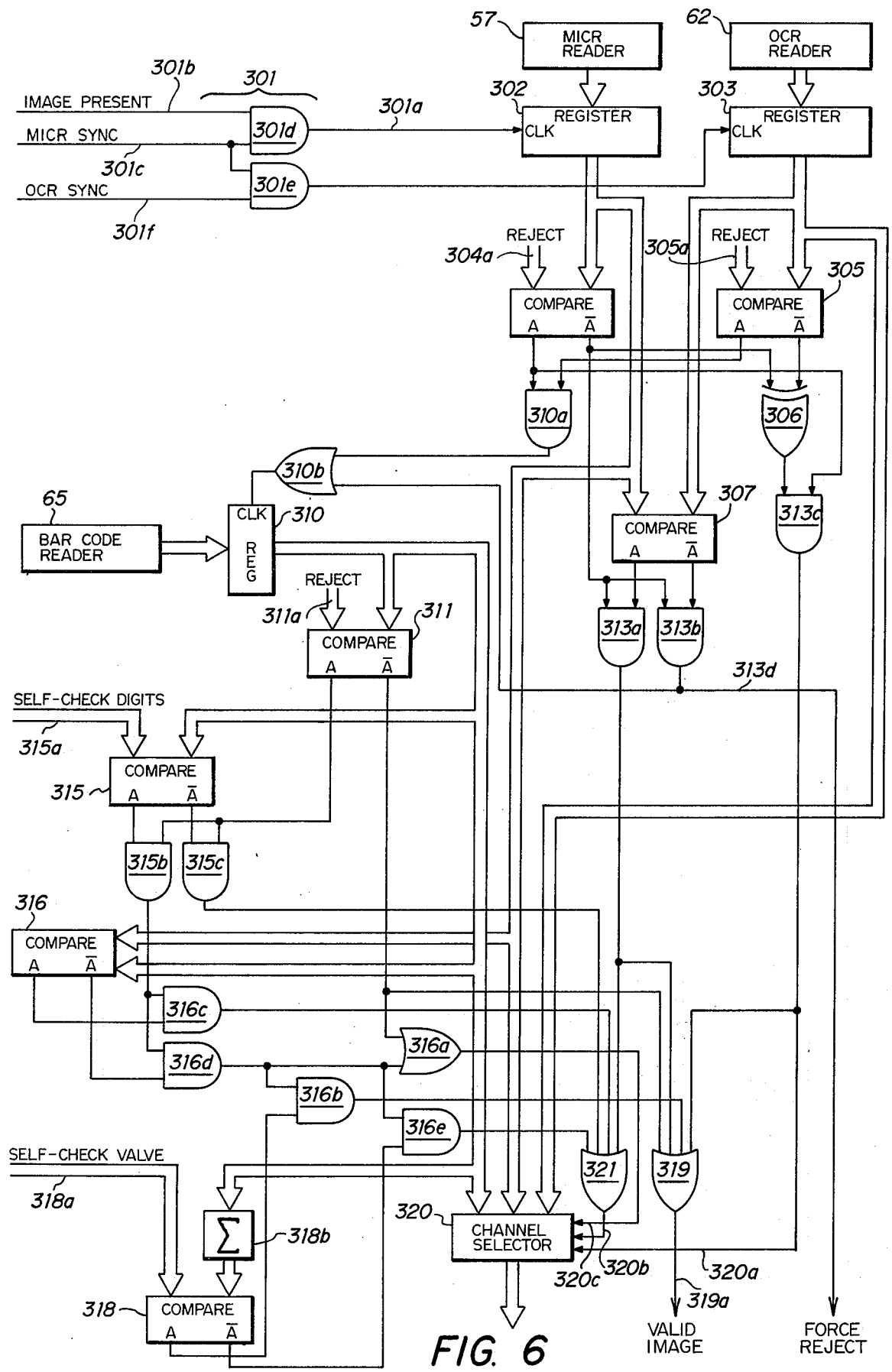
FIG. 6 is a schematic of a logic circuit embodiment of the flow diagram of FIG. 5.

FIG. 6 illustrates a logic system in which the functions described in connection with FIG. 5 are carried out. MICR reader 57, OCR reader 62 and bar-code reader 65 are illustrated as providing inputs to the system. The components of the system have been given reference characters which may be related directly to the reference characters used in FIG. 5. Thus, the functions of FIG. 5 can be followed in terms of the logic of FIG. 6. For example, state 202 of FIG. 5 corresponds to the operation of register 302 of FIG. 6.

MICR data is clocked into register 302 from MICR reader 57 in response to a clock pulse on line 301a. This clock pulse is derived from logic 301 which is responsive to an image present state on line 301b, and a MICR sync pulse on line 301c. Lines 301b and 301c lead to an AND gate 301d, the output of which is connected to the clock input terminal of register 302.

In a similar manner, the output data from OCR reader 62 is connected by a multibit channel to register 303. The data is clocked from reader 62 into register 303 in response to the output of an AND gate 301e having the image present state as one input, and an OCR sync pulse on line 301f as the other input.

Further, the bar-code reader 65 is connected to a register 310. Bar-code data may be clocked into register 310 only when needed, as indicated by operations on data in registers 302 and 303 as will hereinafter appear.

Register 302 is connected to a comparator 304 as is a reject code which appears on a multibit bus 304a. The code on bus 304a is the same code that is produced by reader 57 when a read failure occurs.

The true output of comparator 304 is connected to one input of an AND gate 310a, the output of which is connected as one input to an OR gate 310b. Gate 310b in turn is connected to the clock input terminal of register 310. The true output of comparator 304 is also connected to one input of an AND gate 313c. The false output of comparator 304 is connected to one input each of AND gates 313a and 313b, and to one input of exclusive OR gate 306.

The OCR data register 303 is connected to a multibit comparator 305, the second input to which is the OCR reject code provided by way of bus 305a. The true output of comparator 305 is connected as the second input to AND gate 310a. The false output of comparator 305 is connected as the second input to the exclusive OR gate 306, which in turn is connected as the second input of AND gate 313c.

The outputs of registers 302 and 303 also are connected as the two input signals to a comparator 307. The true output of comparator 307 is connected as the second input to AND gate 313a, while the false output is connected as the second input to AND gate 313b. The output of AND gate 313b applies a reject signal along line 313d to the succeeding system, and is connected as the second input to OR gate 310b. OR gate 310b supplies the clock input signal to the bar-code register 310.

The output of registers 302, 303 and 310 are also connected as inputs to a channel selector 320. Any one of the three sets of input signals leading to selector 320 may be selected as the output signal depending upon the control states on the control lines 320a, 320b, or 320c. AND gate 313c supplies as its output one of the three control signals, namely the signal on line 320a. The output of an OR gate 321 supplies the control signal on line 320b, and the output of an OR gate 316a supplies the control signal on line 320c.

The output of gate 313a is connected as one input to an OR gate 319, which provides an output on line 319a to indicate to the succeeding system that a valid read signal has been generated and transmitted from channel selector 320. The other inputs to OR gate 319 are derived from the output of gate 313c, the output of an AND gate 316b, and the false output of a comparator 311.

The output of register 310 comprises one input to comparator 311, and a bar-code reject signal along line 311a comprises the second input.

The output of register 310 is also supplied as one input to a comparator 315, the second input of which is supplied on bus 315a as a code representing self-check digits in a bar-code self-check field. The true output of comparator 315 is connected as one input to AND gate 315b, while the false output is connected as one input to AND gate 315c. The second inputs to AND gates 315b and 315c are connected to the true output of comparator 311.

The false output of comparator 311 is connected as an input to an AND gate 316a which provides a control signal input to selector 320.

A comparator 316 has as one input the output of register 302, and as a second input the output of register 310. The true output of comparator 316 is applied as one input to AND gate 316c, while the false output is applied as one input of AND gate 316d. The second inputs of gates 316c and 316d are connected to the output of AND gate 315b.

The output of AND gate 316d is connected as an input to OR gate 316a, AND gate 316b and AND gate 316e. Gate 316e supplies one input to OR gate 321. The remaining inputs to OR gate 321 are supplied by the outputs of AND gates 313a, 315c and 316c.

A self-check signal is connected as one input to a comparator 318 by way of a bus 318a. The second input to comparator 318 is supplied by way of a summation unit 318b operating on the output of bar-code register 310 to generate a self-check sum. The true output of comparator 318 is connected as the second input to AND gate 316b, while the false output is connected as the second input to AND gate 316e.

In operation, data is clocked into registers 302 and 303 from reader 57 and reader 62, respectively, upon the occurrence of an image present signal on line 301b coupled with a corresponding reader sync signal appearing on line 301c or line 301f.

Comparators 304 and 305 compare the data in registers 302 and 303 against reject signals identical to read failure signals produced by readers 57 and 62 in operation.

If rejects are present in both the MICR and OCR read data, the output of bar-code reader 65 is clocked into register 310. However, if there are no rejects in the MICR read data, then the MICR and OCR data are compared by comparator 307 to determine whether MICR reader 57 and OCR reader 62 have issued identical recognition signals for the same character image. If the recognition signals are identical, then a valid image flag is issued along line 319a and the MICR read data is selected by channel selector 320 to be output to the succeeding system. If different recognition signals have been issued by readers 57 and 62, a force reject signal is applied by AND gate 313b to line 313d, and read data generated by bar-code reader 65 is clocked into register 310.

In the event rejects are present in the MICR read data but not present in the OCR read data, as determined by comparators 304 and 305, a control signal is applied by AND gate 313c along line 320a to selector 320. The MICR read data is thereby replaced with OCR read data. In addition, a valid image signal is applied by OR gate 319 along line 319a.

When there are no rejects in the MICR read data but conflicting recognition signals are generated by the MICR reader 57 and the OCR reader 62, data is clocked into register 310 when rejects are present in both the MICR and the OCR read data. Under these conditions, if rejects are present in the bar-code read data as determined by comparator 311, the contents of register 310 are tested by comparator 315 to determine whether the bar-code data field is a self-check field. If the data field is not a self-check field, OR gate 321 issues a control signal along line 320b to selector channel 320, thereby selecting the original MICR read data for output to the succeeding system. However, if the data field is a self-check field, an additional test is performed to determine whether a read failure characterized by a bar-code reject signal occurred in the same position as a MICR/OCR reject signal in a corresponding MICR data field. If a position difference is not detected, OR gate 321 issues a control signal along line 320b as before.

In the event reject signals have been generated from different character positions in the MICR and the bar-code data fields, a control signal is applied by OR gate 316a along line 320c to selector 320. The bar-code read data is thus selected for output to the succeeding system. In addition, a self-check test is performed by summation unit 318b acting in combination with comparator 318. If a correct self-check value as characterized by the self-check signal on bus 318a is generated by unit 318b, a valid image signal is applied by OR gate 319 on line 319a. If the correct self-check value is not generated by unit 318b, OR gate 321 issues a control signal along line 320b to select the original MICR data for output.

Having described the invention in connection with certain specific embodiments thereof, it is to be understood that further modifications may now suggest themselves to those skilled in the art and it is intended to cover such modifications as fall within the scope of the appended claims.

What is claimed is:

1. A method of machine processing MICR encoded documents which are optically and magnetically read to produce independent interpretations of data in the MICR field and wherein the independent interpretations are merged to form a single output data stream which may contain ambiguities, which comprises:
   a. sensing a bar-coded version of the data in said MICR field imprinted on said document;
   b. generating a recognition signal indicative of characters thus bar-coded;
   c. generating a final identification signal for each of said characters from said data stream and from said recognition signal;
   d. inhibiting the recognition signal from the final identification signal if the data stream does not contain ambiguities; and
   e. processing the MICR encoded documents in accordance with the final identification signal.

2. The method of machine handling of documents wherein a MICR field on the document ostensibly corresponds to a bar-code field also on said document, which comprises:
   generating a first output by magnetically reading said MICR field;
   generating a second output by optically reading said MICR field;
   generating a third output by reading said bar-code field;
   checking the first, second and third outputs for read failures and output similarity, and:
   a. inhibiting the second and third outputs when no failures are found in the first output and the first and second outputs are the same;
   b. inhibiting the first and third outputs when a read failure is found in the first output;
   c. inhibiting the first and second outputs when said first and second outputs are different;
   d. inhibiting the first and second outputs when said first and second outputs are identical but both indicate a read failure; and
   generating a single output stream representative of the data on said MICR field and said bar-code field from the uninhibited information from said first, second and third outputs.

3. The method of machine handling a document wherein a high velocity stream of documents pass through a reading module having a magnetic reader and a first optical reader sensing a MICR data field and a second optical reader sensing a bar-code data field, which comprises:
   inhibiting the data signals generated by said magnetic reader and said second optical reader when said magnetic reader generates a reject signal;
   inhibiting the data signals generated by said magnetic reader and said first optical reader when both said readers generate reject signals and said second optical reader generates a signal other than a reject signal;

inhibiting a data signal generated by said magnetic reader and said first optical reader when a data signal generated by said magnetic reader is not the same as a data signal generated by said first optical reader and said optical reader generates a signal other than a reject signal;

inhibiting a data signal from said magnetic reader and said first optical reader when both said magnetic reader and said first optical reader generates a reject signal and a reject signal is generated by said second optical reader sensing a bar-code data field having an error free self-checking field, said bar-code data field being sensed in a character position different from a position from which a MICR reject signal is generated;

inhibiting a data signal from said magnetic reader and said first optical reader when a data signal generated by said magnetic reader is not the same as a data signal generated by said first optical reader and said optical reader generates a signal other than a reject signal, and a reject signal is generated by said second optical reader sensing a bar-code data field having an error free self-checking field, said bar-code data field being sensed in a character position different from a position from which a MICR reject signal is generated; and generating a single character data signal from a predetermined combination of uninhibited data signals generated by said magnetic reader, said first optical reader, and said second optical reader.

4. A method generating a single data output stream from signals produced by a magnetic reader and a first optical reader both sensing a MICR data field, and a second optical reader sensing a bar-code data field corresponding to the MICR data field, which comprises:
   a. examining reader output signals for read failures;
   b. comparing output signals of said magnetic and said first optical reader if said magnetic reader generates a signal other than a read failure;
   c. selecting output signal of said first optical reader for said single data stream in the event that a read failure is generated by said magnetic reader and output signal of said first reader is other than a read failure;
   d. examining output signal of said second optical reader for read failures in the event that output signals of said magnetic reader and said optical reader differ, or in the event that both said magnetic reader and said first optical reader generate read failures;
   e. examining output signal of said second optical reader for self-check data if a read failure is generated by said second reader;
   f. comparing positions in said MICR data field and said bar-code data field from which read failures are generated if said bar-code data field is a self-checking field;
   g. generating a self-check sum from said self-checking field and comparing said sum with a predetermined value;
   h. selecting output signal of said second optical reader for said single data stream if said sum is equal to said predetermined value or if a read failure is not generated by said second reader; and
   i. selecting output signal of said magnetic reader when output signals from said first optical reader and said second optical reader are not selected.

5. A reader for documents having a MICR field along with a bar-code field of the data in said MICR field, which comprises:
   means to sense the magnetic properties of said MICR field to produce a first output;
   means to sense the optical properties of said MICR field to produce a second output;
   means to sense said bar-code field to produce a third output;
   means for inhibiting the first and third outputs of the first output represents a read failure and rejects are not present in the second output;
   means for inhibiting said third output if said first and second outputs are the same and do not represent a read failure; and
   means to produce a single character data signal from a predetermined combination of uninhibited information from said first, second and third outputs.

6. The combination set forth in claim 5 wherein a carrier is provided successively to move said documents past MICR, OCR, and bar-code read stations at high speed, and wherein multiplexing means is employed to receive said first, second and third outputs to form said single character data signal.

7. The combination set forth in claim 5 wherein means are provided to inhibit use of said second and third outputs if said first output provides a successful read signal.

8. The combination set forth in claim 5 wherein means are provided to inhibit said third output if a read failure in said first output is supplemented by said second output.

9. The combination set forth in claim 5 including means for inhibiting the first and second outputs when said first and second outputs are identical but both indicate a read failure.

10. The combination set forth in claim 5 including means for inhibiting the first and second outputs when said first and second outputs differ.

11. The combination set forth in claim 5 including means for inhibiting the first and second outputs when one of the following conditions occur:
   1. the first and second outputs are different from one another, or
   2. the first and second outputs are identical but both indicate a read failure.

12. In an automatic document sorting system in which a high velocity stream of documents are passed through a print reading module, the combination which comprises:
   a. magnetic reader means for reading a first encoded data field imprinted on a document;
   b. a first optical reader means for reading said first data field to supplement the output of said magnetic reader means;
   c. a second optical reader means for reading a second encoded data field imprinted on said document to supplement the output of said magnetic reader means and said first optical reader means; and
   d. data merging means accepting outputs of said magnetic reader means for generating a single data stream, said data merging means including means for selecting: (1) the first encoded data when no failures are found in the first data and the data from the magnetic reader means and the first optical reader means are the same; (2) the data from said first optical reader means when a read failure is found in the encoded data from the magnetic reader means; (3) the encoded data from the second optical reader means when the encoded data from the magnetic reader means and the first optical reader means are different; and (4) the encoded data from the second optical reader means when the encoded data from the magnetic reader means and the first optical reader means are identical but both indicate a read failure.

13. The combination set forth in claim 12 wherein said second optical reader means is positioned downstream from said magnetic reader means.

14. The combination set forth in claim 12 wherein said first encoded data field is printed with a magnetic ink in a MICR format.

15. The combination set forth in claim 12 wherein said second encoded data field is printed with a fluorescent ink in a bar-code format.

16. A reader for a document having a MICR field along with a field for bar-code data related to said MICR field, which comprises:
   means to sense the magnetic properties of said MICR field to produce a first output;
   means to sense the optical properties of said MICR field to produce a second output;
   means to sense said bar-code field to produce a third output;
   means for merging the first output and the second output into a composite data stream;
   a code printer located downstream of the document travel path from said means for sensing; and
   means responsive to the third output signal for actuating said code printer from the composite data stream when the field for bar-code data has not been previously encoded and for inhibiting the operation of said printer when a document has been previously encoded on the bar code field.

17. A reader for documents as set forth in claim 16 including:
   second means to sense said bar code field located downstream of said code printer to produce a fourth output; and
   comparison means responsive to inputs comprising the composite data stream and the fourth output to produce a document sort signal upon a favorable comparison of the two inputs and a document reject signal for an unfavorable comparison.

18. A reader for documents as set forth in claim 17 including means connected to said comparison means for generating a system shutdown signal when a preselected number of document reject signals have been generated.

19. A reader for documents as set forth in claim 16 including verification means responsive to the composite data stream to verify the identification of read characters and generating a document reject signal upon a failure to verify the reading of characters in the MICR field.

20. A reader for documents as set forth in claim 19 wherein all characters that are verified by said verification means are encoded on a document by said printer means.

21. A reader for documents as set forth in claim 16 including means for recording the composite data stream for each document passing said means for sensing.

22. A reader for documents having a MICR field along with a field for bar-code data related to said MICR field, which comprises:
   means to sense the magnetic properties of said MICR field to produce a first output;
   means to sense the optical properties of said MICR field to produce a second output;
   means to sense said bar-code field to produce a third output;
   means for merging the first output and the second output into a composite data stream;
   means for generating an item control number for each document passing said means for sensing; and
   means for combining the composite data stream and the positive item control number into a character data stream; and
   means responsive to the third output signal and the character data stream to produce a code print signal when the field for the bar-code data has not been previously encoded.

23. A reader for documents as set forth in claim 22 including verification means responsive to the character data stream to verify the identification of read characters and generate a document reject signal upon a failure to verify the reading of characters in the MICR field.

24. A reader for documents as set forth in claim 23 including means for recording the composite data stream for each document passing said means for sensing.

25. A reader for documents as set forth in claim 22 including a second means for sensing said bar-code field located downstream of said first means for sensing the bar-code field to produce a fourth output; and
   comparison means responsive to inputs comprising the character data stream and the fourth output to produce a document sort signal upon a favorable comparison of the two inputs and a document reject signal for an unfavorable comparison.

26. A reader for documents as set forth in claim 25 including means connected to said comparison means for generating a system shutdown signal when a preselected number of document reject signals have been generated.

27. A reader for documents having a MICR field along with a field for bar-code data related to said MICR field, which comprises:
   means to sense the magnetic properties of said MICR field to produce a first output;
   means to sense the optical properties of said MICR field to produce a second output;
   means to sense said bar-code field to produce a third output;
   means for merging the first output and the second output into a composite data stream;
   means for generating a positive item control number for each document passing said means for sensing;
   means for combining the positive item control number and the composite data stream into a character data stream;
   a code printer located downstream of the document travel path from said means for sensing;
   means responsive to the third output signal for actuating said code printer from the character data stream when the field for bar-code data has not been previously encoded and for inhibiting the operation of said printer when a document has been previously encoded on the bar-code field; and verification means responsive to the character data stream to verify the identification of read characters and generate a document reject signal upon a failure to verify the reading of characters in the MICR field.

28. A reader for documents as set forth in claim 27 including:

second means to sense said bar-code field located downstream of said code printer to produce a fourth output; and comparison means responsive to inputs comprising the character data stream and the fourth outputs to produce a document sort signal upon a favorable comparison of the two inputs and a document reject signal for an unfavorable comparison.

29. A reader for documents as set forth in claim 28 including means connected to said comparison means for generating a system shutdown signal when a preselected number of document reject signals have been generated.

* * * * *

UNITED STATES PATENT OFFICE
CERTIFICATE OF CORRECTION

Patent No. 3,949,363        Dated April 6, 1976

Inventor(s) Larry E. Holm

It is certified that error appears in the above-identified patent and that said Letters Patent are hereby corrected as shown below:

Col. 5, line 13, "connector" should be --counter--;
       line 23, "132" (2nd occurrence) should be --132b--;
       line 37, after "test" insert --of--.
Col. 7, line 54, "301fas" should be --301f as--.
Col. 9, line 43, after "310" insert --as before described. Further, data is clocked into register 310--.

Signed and Sealed this

Twentieth Day of July 1976

[SEAL]

Attest:

RUTH C. MASON
*Attesting Officer*

C. MARSHALL DANN
*Commissioner of Patents and Trademarks*